US012023652B2

(12) United States Patent
Noguchi et al.

(10) Patent No.: US 12,023,652 B2
(45) Date of Patent: *Jul. 2, 2024

(54) EXHAUST GAS PURIFICATION CATALYST

(71) Applicant: Cataler Corporation, Kakegawa (JP)

(72) Inventors: Takahiro Noguchi, Kakegawa (JP); Ryota Onoe, Kakegawa (JP); Ryo Tasaki, Kakegawa (JP); Momoko Iwai, Kakegawa (JP); Yamato Matsushita, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 225 days.

This patent is subject to a terminal disclaimer.

(21) Appl. No.: 17/437,972

(22) PCT Filed: Mar. 10, 2020

(86) PCT No.: PCT/JP2020/010229
§ 371 (c)(1),
(2) Date: Sep. 10, 2021

(87) PCT Pub. No.: WO2020/195777
PCT Pub. Date: Oct. 1, 2020

(65) Prior Publication Data
US 2022/0176354 A1     Jun. 9, 2022

(30) Foreign Application Priority Data
Mar. 27, 2019  (JP) .................. 2019-061779

(51) Int. Cl.
*B01J 23/42*     (2006.01)
*B01J 23/44*     (2006.01)
(Continued)

(52) U.S. Cl.
CPC ............. *B01J 23/464* (2013.01); *B01J 23/42* (2013.01); *B01J 23/44* (2013.01); *B01J 35/19* (2024.01);
(Continued)

(58) Field of Classification Search
CPC . B01J 23/42; B01J 23/44; B01J 23/464; B01J 35/0006; B01J 35/04; F01N 3/20
(Continued)

(56) References Cited

U.S. PATENT DOCUMENTS 6,087,298 A * 7/2000 Sung ..................... F01N 3/2803
                                                502/328
6,375,910 B1 * 4/2002 Deeba ...................... B01J 35/04
                                                502/340
(Continued)

FOREIGN PATENT DOCUMENTS

CN    101052792 A    10/2007
CN    101224424 A    7/2008
(Continued)

OTHER PUBLICATIONS

Chinese Office Action dated Feb. 15, 2023 (7 pages).
(Continued)

*Primary Examiner* — Cam N. Nguyen
(74) *Attorney, Agent, or Firm* — Occhiuti & Rohlicek LLP

(57) ABSTRACT

An exhaust gas purification catalyst provides excellent removal performance of methane, which is chemically stable. Exhaust gas purification catalyst includes a substrate that divides cells through which an exhaust gas flows and a catalyst layer that is provided on a surface of the substrate. The catalyst layer includes a palladium layer containing palladium that extends from a first end part which is an end part on the side into which an exhaust gas in the cells flows
(Continued)

to a second end part which is an end part on the side from which an exhaust gas flows out, a platinum layer containing platinum that extends from the second end part to the first end part, and a rhodium layer containing rhodium that is laminated with both the palladium layer and the platinum layer.

6 Claims, 7 Drawing Sheets

(51) Int. Cl.
  *B01J 23/46* (2006.01)
  *B01J 35/00* (2024.01)
  *B01J 35/04* (2006.01)
  *F01N 3/20* (2006.01)

(52) U.S. Cl.
  CPC ............ *F01N 3/20* (2013.01); *F01N 2570/10* (2013.01); *F01N 2570/12* (2013.01); *F01N 2570/14* (2013.01)

(58) Field of Classification Search
  USPC ........... 502/258–262, 332–334, 339, 527.12, 502/527.13
  See application file for complete search history.

(56) References Cited

U.S. PATENT DOCUMENTS

| | | | |
|---|---|---|---|
| 6,514,905 B1 | 2/2003 | Hanaki et al. | |
| 7,524,465 B2* | 4/2009 | Kumar | B01J 23/44 422/180 |
| 7,922,988 B2* | 4/2011 | Deeba | B01D 53/9472 422/177 |
| 8,318,632 B2* | 11/2012 | Matsueda | F01N 3/0864 502/262 |
| 8,323,599 B2* | 12/2012 | Nunan | B01J 35/0006 60/299 |
| 8,394,348 B1* | 3/2013 | Nunan | B01J 35/04 60/299 |
| 8,501,661 B2* | 8/2013 | Sunada | B01J 23/002 502/333 |
| 8,546,296 B2* | 10/2013 | Yabuzaki | B01J 37/0248 428/116 |
| 8,557,204 B2* | 10/2013 | Nunan | B01J 35/0006 422/177 |
| 8,808,653 B2* | 8/2014 | Mikita | B01J 23/83 502/349 |
| 8,853,120 B2* | 10/2014 | Aoki | B01D 53/945 502/527.12 |
| 8,927,454 B2* | 1/2015 | Itou | B01J 37/0244 502/262 |
| 8,968,690 B2* | 3/2015 | Nunan | B01J 35/1019 422/177 |
| 9,440,223 B2* | 9/2016 | Aoki | B01J 35/0006 |
| 9,486,793 B2* | 11/2016 | Klingmann | B01J 23/63 |
| 9,517,462 B2* | 12/2016 | Roesch | B01J 23/63 |
| 9,522,360 B2* | 12/2016 | Schmidt | F01N 3/0864 |
| 9,550,176 B2* | 1/2017 | Sato | B01J 29/068 |
| 9,616,410 B2* | 4/2017 | Okada | B01J 23/22 |
| 9,732,648 B2* | 8/2017 | Yamada | B01D 53/9468 |
| 10,125,649 B2* | 11/2018 | Onoe | B01J 35/04 |
| 10,159,935 B2* | 12/2018 | Onoe | B01J 35/04 |
| 10,183,253 B2* | 1/2019 | Onoe | B01J 23/63 |
| 10,201,805 B2* | 2/2019 | Ohashi | B01J 21/066 |
| 10,286,359 B2* | 5/2019 | Chiffey | B01J 23/58 |
| 10,344,655 B2* | 7/2019 | Onoe | F01N 3/28 |
| 10,413,885 B2* | 9/2019 | Suzuki | B01J 35/04 |
| 10,512,898 B2* | 12/2019 | Deeba | B01J 35/0006 |
| 10,556,223 B2* | 2/2020 | Suzuki | B01J 37/031 |
| 10,576,420 B2* | 3/2020 | Chinzei | C01F 17/224 |
| 10,618,034 B2* | 4/2020 | Kasuya | B01J 23/63 |
| 10,737,219 B2* | 8/2020 | Onozuka | B01J 23/10 |
| 10,974,228 B2* | 4/2021 | Chandler | B01J 37/0248 |
| 11,110,435 B2* | 9/2021 | Onoe | B01J 35/0006 |
| 11,154,842 B2* | 10/2021 | Hoshino | B01D 53/9468 |
| 11,161,098 B2* | 11/2021 | Nunan | B01J 37/0201 |
| 11,420,189 B2* | 8/2022 | Sawada | B01J 35/04 |
| 11,577,234 B2* | 2/2023 | Dong | B01D 53/9472 |
| 11,633,724 B2* | 4/2023 | Oishi | F01N 3/2803 502/303 |
| 2007/0219089 A1 | 9/2007 | Goto | |
| 2007/0277513 A1 | 12/2007 | Yoshida et al. | |
| 2009/0275468 A1 | 11/2009 | Taki et al. | |
| 2011/0041486 A1 | 2/2011 | Kato et al. | |
| 2011/0113754 A1 | 5/2011 | Kohara et al. | |
| 2012/0040824 A1 | 2/2012 | Itou et al. | |
| 2012/0055142 A1 | 3/2012 | Hilgendorff | |
| 2013/0150236 A1 | 6/2013 | Aoki | |
| 2015/0375206 A1 | 12/2015 | Aoki | |
| 2016/0067690 A1 | 3/2016 | Sato et al. | |
| 2016/0199816 A1 | 7/2016 | Matsueda et al. | |
| 2016/0222851 A1 | 8/2016 | Kawabata et al. | |
| 2016/0236181 A1 | 8/2016 | Inoda et al. | |
| 2016/0288100 A1* | 10/2016 | Goto | B01J 23/002 |
| 2017/0218809 A1 | 8/2017 | Hoyer et al. | |
| 2017/0296969 A1 | 10/2017 | Ohashi et al. | |
| 2018/0178198 A1 | 6/2018 | Deeba et al. | |
| 2018/0361364 A1 | 12/2018 | Arnold et al. | |
| 2019/0143311 A1* | 5/2019 | Ando | B01J 23/464 423/213.5 |
| 2019/0240643 A1* | 8/2019 | Karpov | B01J 23/44 |
| 2020/0276567 A1* | 9/2020 | Onoe | B01J 23/63 |
| 2020/0316579 A1 | 10/2020 | Takesue et al. | |
| 2021/0283580 A1* | 9/2021 | Zheng | B01J 35/1019 |
| 2022/0055021 A1* | 2/2022 | Liu | B01D 53/9472 |
| 2022/0161236 A1* | 5/2022 | Vjunov | B01J 23/42 |

FOREIGN PATENT DOCUMENTS

| | | |
|---|---|---|
| CN | 102131582 A | 7/2011 |
| CN | 102421526 A | 4/2012 |
| CN | 102802784 A | 11/2012 |
| CN | 103157516 A | 6/2013 |
| CN | 103338863 A | 10/2013 |
| CN | 104797336 A | 7/2015 |
| CN | 104981288 A | 10/2015 |
| CN | 105536785 A | 5/2016 |
| CN | 105722590 A | 6/2016 |
| CN | 105813733 A | 7/2016 |
| CN | 106794421 A | 5/2017 |
| CN | 107148310 A | 9/2017 |
| DE | 112014000481 T5 | 11/2015 |
| EP | 1834694 A1 | 9/2007 |
| EP | 2444152 A1 | 4/2012 |
| GB | 2023019 A | 12/1979 |
| IN | 105658309 A | 6/2016 |
| JP | S5941706 A | 3/1984 |
| JP | S6268542 A | 3/1987 |
| JP | S63084635 A | 4/1988 |
| JP | H06126173 A | 5/1994 |
| JP | H06246159 A | 9/1994 |
| JP | H09-57098 A | 3/1997 |
| JP | 2001079402 A | 3/2001 |
| JP | 2001503497 A | 3/2001 |
| JP | 2002166172 A | 6/2002 |
| JP | 2003251200 A | 9/2003 |
| JP | 2004000838 A | 1/2004 |
| JP | 2008175118 A | 7/2008 |
| JP | 2010005590 A | 1/2010 |
| JP | 2010005591 A | 1/2010 |
| JP | 2010-29752 A | 2/2010 |
| JP | 2010179204 A | 8/2010 |
| JP | 2011235264 A | 11/2011 |
| JP | 2011255378 A | 12/2011 |
| JP | 2013119075 A | 6/2013 |
| JP | 2015006660 A | 1/2015 |
| JP | 2017104823 A | 6/2017 |
| JP | 2018159380 A | 10/2018 |
| WO | 9820238 A1 | 5/1998 |
| WO | 2010001226 A1 | 1/2010 |

(56) References Cited

FOREIGN PATENT DOCUMENTS

| WO | 2012101505 A  | 8/2012  |
|----|---------------|---------|
| WO | 2014080202 A1 | 5/2014  |
| WO | 2015071724 A  | 5/2015  |
| WO | 2015087872 A1 | 6/2015  |
| WO | 2016031104 A1 | 3/2016  |
| WO | 2017204008 A1 | 11/2017 |

OTHER PUBLICATIONS

International Search Report, PCT Application No. PCT/JP2020/010229, mailed Jun. 2, 2020 (4 pages).
International Preliminary Report on Patentability in PCT/JP2020/010229, mailed Oct. 7, 2021.
Indian Office Action, mailed Jan. 28, 2022.
Extended European Search Report, mailed Mar. 30, 2022.
Japan Office Action, mailed Aug. 31, 2022.
Indian Office Action, mailed Jan. 4, 2023.
Sae Technical Paper Series, "Evaluation of 3-Way Catalytic Converters for the Reduction of CH4 in the Exhaust Stream of a CNG Fueled Vehicle", Seventh International Pacific Conference and Exposition on Automotive Engineering, Phoenix, Arizona, Nov. 15-19, 1993.
Office Action issued in Chinese Application No. 202080024933.8, dated Jul. 1, 2023.
Japanese Office Action, mailed Jul. 21, 2020, in JP Application No. 2019-061780.
Decision to Grant in JP Application No. 2019-061780, mailed Sep. 9, 2020.
Chinese Office Action, mailed Mar. 31, 2023 in CN Application No. 202080025102.2.

* cited by examiner (EXAMPLE1-1)

(EXAMPLE1-2)

(EXAMPLE1-3)

(EXAMPLE1-4)

(EXAMPLE1-5)

(EXAMPLE1-6)

(EXAMPLE1-7)

EXHAUST GAS PURIFICATION CATALYST

CROSS REFERENCE TO RELATED APPLICATIONS

This application is a 371 application of International Application no. PCT/JP2020/010229, filed Mar. 10, 2020, which claims priority to Japanese Patent Application no. 2019-061779, filed Mar. 27, 2019, the contents of which are incorporated herein by reference.

TECHNICAL FIELD

The present invention relates to an exhaust gas purification catalyst used for purifying exhaust gas containing methane.

BACKGROUND ART

Exhaust gases discharged from the internal combustion engines (engines) of vehicles such as automobiles contain harmful gas components such as hydrocarbons (HC), carbon monoxide (CO), and nitrogen oxides ($NO_x$) along with particulate matter (PM) containing carbon as a main component. Exhaust gas regulations for regulating the discharge amount of these harmful gases and PM are strengthening year by year. Therefore, in internal combustion engines and their peripheral technologies, research has been conducted to reduce the discharge amount of harmful gases and PM from vehicles and the like.

As an example, in vehicles in recent years, in order to constrain an amount of $CO_2$ discharged from an internal combustion engine, drive control of the internal combustion engine that reduces the consumption of a fuel itself such as "Fuel Cut" (hereinafter referred to as F/C) and "Idling Stop" (stopping an operation of the internal combustion engine when the vehicle is stopped; hereinafter referred to as I/S) has been performed, and the frequency with which these controls are performed is also increasing. In addition, there are an increasing number of vehicles having an internal combustion engine that repeats stopping and restarting frequently such as hybrid vehicles. In addition, vehicles using natural gas internal combustion engines that use natural gas as a fuel are also being focused on since their $CO_2$ discharge amount per unit distance is low. Separately, harmful gases and PM of which amounts could not be reduced by the internal combustion engine are detoxified or collected with the exhaust gas purification catalyst and removed before the exhaust gas is discharged from the vehicle and the like. Examples of the prior art related to an exhaust gas purification catalyst include Patent Literature 1 and 2.

CITATION LIST

Patent Literature

Patent Literature 1: Japanese Patent Application Publication No. 2011-255378
Patent Literature 2: Japanese Patent Application Publication No. S59-041706

SUMMARY OF INVENTION

Incidentally, an exhaust gas purification catalyst functions only after it has been heated to a temperature at which a precious metal catalyst is activated by the exhaust gas. In addition, HC discharged from the internal combustion engine include components such as aromatic compounds and olefins that readily combust at relatively low temperatures and also paraffins that are unlikely to decompose at low temperatures, and among these, methane ($CH_4$) is particularly chemically stable. Therefore, in I/S control, hybrid vehicles and the like, in an environment in which the temperature of the exhaust gas discharged from the internal combustion engine tends to decrease, it is difficult to remove methane from the exhaust gas discharged at cold start of the internal combustion engine to purify, and contaminating methane is released into the atmosphere. This can be a particularly important issue for a natural gas internal combustion engine that uses natural gas including 90 mass % or more of methane as a fuel, although the $CO_2$ discharge amount per unit distance is low.

The present invention has been made in view of the above circumstances, and an object of the present invention is to provide an exhaust gas purification catalyst having excellent removal performance of methane, which is chemically stable.

According to the present invention, there is provided an exhaust gas purification catalyst that is configured to be disposed in an exhaust path of an internal combustion engine and purify an exhaust gas discharged from the internal combustion engine. The exhaust gas purification catalyst includes a substrate divided into cells through which an exhaust gas flows and a catalyst layer that is provided on a surface of the substrate. The catalyst layer includes a palladium (Pd) layer, a platinum (Pt) layer, and a rhodium (Rh) layer. The Pd layer extends from a first end part which is an end part on the side of the cells into which an exhaust gas flows to a second end part which is an end part on the side of the cells from which an exhaust gas flows out and contains Pd. The Pt layer extends from the second end part to the first end part and contains Pt. The Rh layer is laminated with both the Pd layer and the Pt layer and contains Rh.

In the exhaust gas purification catalyst, Pd, Pt, and Rh are independently provided in separate layers. Thereby, it is possible to exhibit more favorably methane removal performance of individual precious metal catalysts even during long-term use of the exhaust gas purification catalyst. In the above configuration, the palladium layer is provided at the end part on the exhaust gas inflow side, and thereby a high methane removal rate can be achieved even under various exhaust gas conditions (for example, lean environment) that change according to control of the internal combustion engine. In addition, in the above configuration, the platinum layer is provided at the end part of the exhaust gas discharge side, and thereby the platinum layer can exhibit extremely high methane removal performance under exhaust gas conditions alleviated by the rhodium layer (for example, close to the stoichiometric environment). In addition, in the above configuration, the rhodium layer is provided in contact with the palladium layer and the platinum layer, and thereby it is possible to improve methane removal performance compared with if the palladium layer and the platinum layer were formed alone.

In a preferable aspect of the exhaust gas purification catalyst of the present technology, the palladium layer is provided in a region of 80% or less when a range from the first end part to the second end part of the substrate is 100%. Therefore, it is possible to appropriately adjust conditions of the exhaust gas sent to the platinum layer on the exhaust gas discharge side, reduce the proportion of the platinum layer, and achieve a high methane removal rate.

In a preferable aspect of the exhaust gas purification catalyst of the present technology, the rhodium layer is provided in a region of 60% or more and 100% or less from the first end part when the range from the first end part to the second end part of the substrate is 100%. Therefore, it is possible to achieve a high methane removal rate. In addition, it is then possible to favorably remove $NO_x$ from the exhaust gas.

In a preferable aspect of the exhaust gas purification catalyst of the present technology, the platinum layer is provided in a region of 30% or more and 80% or less from the second end part when the range from the first end part to the second end part of the substrate is 100%. Thereby, it is possible to achieve a high methane removal rate while reducing the proportion of the platinum layer.

In a preferable aspect of the exhaust gas purification catalyst of the present technology, a ratio A/B of a molar amount A of the palladium contained per unit volume of the substrate of a portion in which the palladium layer is provided in a length direction from the first end part to the second end part of the substrate to a molar amount B of the platinum contained per unit volume of the substrate of a portion in which the platinum layer is provided in the length direction is 1.2 or more and 2.8 or less. With such a configuration, even if the total amount of palladium and platinum used is the same, it is possible to further improve the methane removal performance.

In a preferable aspect of the exhaust gas purification catalyst of the present technology, the rhodium layer is provided to cover a part or all of an upper surface of the palladium layer and the platinum layer. With such a configuration, it is possible to increase the efficiency of contact between the palladium layer and the exhaust gas and achieve a high methane removal rate and the $NO_x$ removal rate with the palladium layer. In addition, it is possible to appropriately adjust conditions of the exhaust gas sent to the platinum layer.

In a preferable aspect of the exhaust gas purification catalyst of the present technology, the catalyst is used to purify an exhaust gas discharged from the internal combustion engine that uses natural gas as a fuel. When the internal combustion engine uses natural gas as a fuel, 80 mass % or more of HC contained in the exhaust gas can be methane. The exhaust gas purification catalyst of the present technology is preferable since the above effects are exhibited more preferably when it is applied to purify such an exhaust gas having a high methane content.

DESCRIPTION OF EMBODIMENTS

Figure 1:
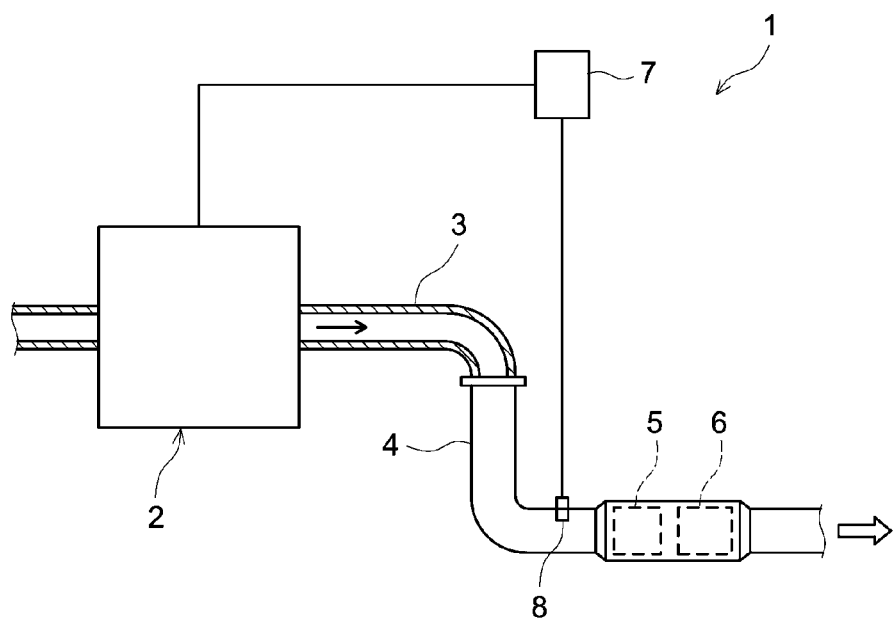
FIG. 1 is a schematic view showing a configuration of an exhaust gas purification system according to one embodiment.

Hereinafter, preferable embodiments of the present invention will be described with reference to the drawings. Here, matters other than the matters specifically set forth in the present specification and that are necessary for carrying out the present invention can be recognized by those skilled in the art as design matters based on the related art in the field. The present invention can be implemented based on content disclosed in this specification and common technical knowledge in the field. In addition, members and portions having the same functions are denoted with the same reference numerals in the following drawings, and redundant descriptions thereof will be omitted or simplified. The dimensional relationships (a length, a width, a thickness, and the like) in the drawings do not reflect actual dimensional relationships. Here, "A to B" indicating a numerical value range in this specification means "A or more and B or less."

FIG. 1 is a schematic view showing an exhaust gas purification system 1 according to one embodiment. The exhaust gas purification system 1 removes harmful components, for example, HC, CO, and $NO_x$, contained in an exhaust gas discharged from an internal combustion engine 2, and collects PM contained in the exhaust gas. The exhaust gas purification system 1 includes the internal combustion engine 2 and an exhaust path. The exhaust gas purification system 1 according to the present embodiment includes the internal combustion engine 2, an exhaust path, an engine control unit (ECU) 7, and a sensor 8. The exhaust gas purification catalyst in the present technology is provided in the exhaust path of the internal combustion engine 2 as a component of the exhaust gas purification system 1. Thus, the exhaust gas flows in the exhaust path. The arrow in the drawings indicates the flow direction of the exhaust gas. Here, in this specification, the side close to the internal combustion engine 2 along the flow of the exhaust gas is called the upstream side, and the side away from the internal combustion engine 2 is called the downstream side.

An air-fuel mixture containing oxygen and a fuel gas is supplied to the internal combustion engine 2. The internal combustion engine 2 converts thermal energy generated by burning the air-fuel mixture into kinetic energy. The ratio between oxygen and the fuel gas supplied to the internal combustion engine 2 is controlled by the ECU 7. The burned air-fuel mixture becomes an exhaust gas and is discharged to the exhaust path. The internal combustion engine 2 having the configuration shown in FIG. 1 is mainly composed of an internal combustion engine that uses natural gas as a fuel.

The internal combustion engine 2 is connected to the exhaust path at an exhaust port (not shown). The exhaust path of the present embodiment is composed of an exhaust manifold 3 and an exhaust pipe 4. The internal combustion engine 2 is connected to the exhaust pipe 4 via the exhaust manifold 3. In the exhaust path, typically, a catalyst body 5 and a filter body 6 are provided. For example, the catalyst body 5 is an example of the exhaust gas purification catalyst in the present technology. The catalyst body 5 may include, for example, a two-way catalyst and other catalysts such as an HC selective reduction NOx catalyst, a NOx storage reduction catalyst, and a urea selective reduction NOx catalyst. The filter body 6 is not an essential configuration, and can be provided as necessary. When the filter body 6 is provided, its configuration may be the same as in the related art, and is not particularly limited. The filter body 6 may be, for example, a particulate filter (PF) that captures fine PM and reduces the number of discharged particles, or a catalyst particulate filter that is provided with a catalyst purification function by supporting a two-way or a three-way catalyst or the like thereon. Here, when arrangement of the catalyst in the catalyst particulate filter is the same as that of the exhaust gas purification catalyst according to the present technology, the filter body 6 is an example of the catalyst body 5. With regard to the catalyst body 5 and the filter body 6, the arrangement thereof is arbitrarily variable, and the catalyst body 5 and the filter body 6 may be independently provided alone or a plurality thereof may be provided.

The ECU 7 is electrically connected to the internal combustion engine 2 and the sensor 8. The ECU 7 receives signals from various sensors (for example, an oxygen sensor, a temperature sensor, and a pressure sensor) 8 that detect an operation state of the internal combustion engine 2 and control driving of the internal combustion engine 2. The configuration of the ECU 7 may be the same as in the related art, and is not particularly limited. The ECU 7 is, for example, a processor or an integrated circuit. An ECU 26 receives, for example, information such as an operation state of a vehicle or the like, and an amount, a temperature, and a pressure of the exhaust gas discharged from the internal combustion engine 2. In addition, for example, the ECU 7 performs operation control such as fuel injection control, ignition control, and intake air volume adjustment control on the internal combustion engine 2 according to the received information.

Figure 2:
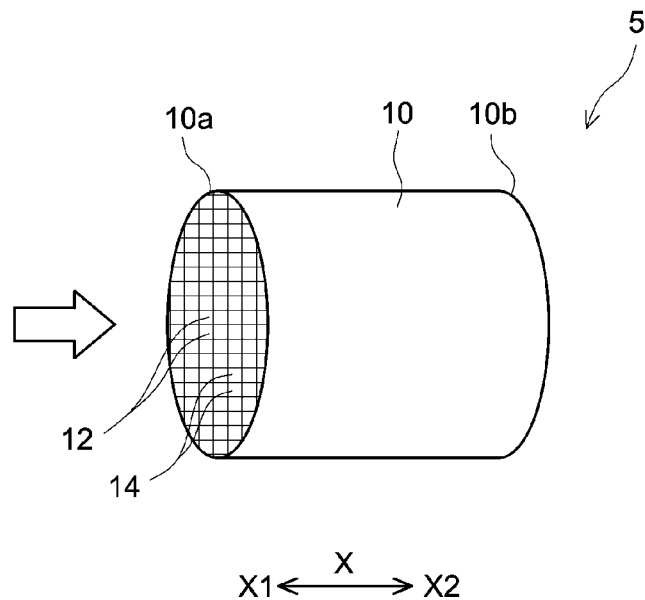
FIG. 2 is a perspective view schematically showing an exhaust gas purification catalyst according to one embodiment.
Figure 3:
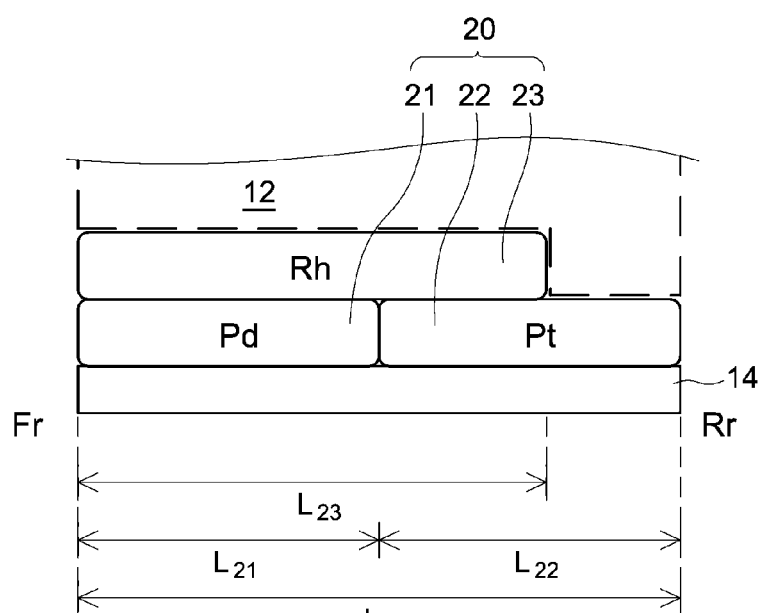
FIG. 3 is a partial cross-sectional view schematically showing a configuration of a catalyst layer in the exhaust gas purification catalyst according to one embodiment.

FIG. 2 is a perspective view of the catalyst body 5 according to one embodiment. X in the drawing indicates a first direction in the catalyst body 5. The catalyst body 5 is installed in the exhaust pipe 4 so that the first direction is along a flow direction of the exhaust gas. For convenience, focusing on the flow of the exhaust gas, one direction X1 among the first directions X is referred to as toward an exhaust gas inflow side (upstream side), and the other direction X2 is referred to as toward an exhaust gas outflow side (downstream side). In addition, for the catalyst body 5, one direction X1 may be referred to as toward a front (Fr) side, and the other direction X2 may be referred to as toward a rear (Rr) side. FIG. 3 is a schematic view of an enlarged part of a cross section of the catalyst body 5 according to one embodiment cut in the first direction X. The catalyst body 5 disclosed here includes, for example, a substrate 10 having a straight flow structure and a catalyst layer 20. Hereinafter, the substrate 10 and the catalyst layer 20 will be described in this order.

Various materials and forms used in this type of applications in the related art can be used for the substrate 10. The substrate 10 typically has a so-called honeycomb structure. Regarding the substrate 10, for example, a substrate made of a material having high heat resistance and high resistance to a sudden temperature change, which is represented by ceramics such as cordierite, aluminum titanate, and silicon carbide (SiC) or alloys such as stainless steel, can be suitably used. The outer shape of the substrate 10 is not particularly limited, and as an example, a cylindrical substrate (the present embodiment) may be mentioned. However, regarding the outer shape of the entire substrate, in addition to a cylindrical shape, an elliptical cylindrical shape, a polygonal pillar shape, an amorphous shape, a pellet shape, and the like may be used. In the present embodiment, the column axis direction of the cylindrical substrate 10 matches the first direction X. An end part of the substrate 10 in one direction X1 is a first end part 10a, and an end part in the other direction X2 is a second end part 10b. In this specification, the size of the component such as the substrate 10 in the first direction X is referred to as a length.

In the substrate 10, cells (cavities) 12 in the honeycomb structure extend in the first direction X. The cells 12 are through-holes which pass through the substrate 10 in the first direction X and serve as an exhaust gas flow path. The substrate 10 includes partition walls 14 that divide the cells 12 from each other. The shape of the cross section (hereinafter simply referred to as a "cross section") orthogonal to the first direction X of the cell 12, in other words, the structure of the partition wall 14 that partitions the cell is not particularly limited. For example, the shape of the cross section of the cells 12 may be various geometric shapes such as a rectangle such as a square, a parallelogram, an oblong, or a trapezoid, a triangle, other polygons (for example, a hexagon and an octagon), and a circle. The shape, size, and number of cells 12 can be appropriately designed in consideration of the flow rate and components of the exhaust gas supplied to the catalyst body 5.

The partition wall 14 faces the cell 12 and separates adjacent cells 12. It is preferable that the thickness (size in the direction orthogonal to the surface; the same applies hereinafter) of the partition wall 14 be thin because it is possible to increase the specific surface area of the substrate 10 and reduce the weight and reduce the heat capacity. The thickness of the partition walls 14 may be, for example, 1 mm or less, 0.75 mm or less, 0.5 mm or less, or 0.1 mm or less. On the other hand, when the partition wall 14 has an appropriate thickness, the strength and durability of the catalyst body 5 are improved. In consideration of this, the thickness of the partition walls 14 may be, for example, 0.01 mm or more, or 0.025 mm or more. In the catalyst body 5 of the present embodiment, no catalyst layer 20 is formed inside the partition wall 14. Therefore, the partition wall 14 can be a porous component, but its porosity may be small (for example, 30% or less). The substrate 10 in the embodiment may have a shape such as a so-called straight flow type and can be distinguished from a so-called wall flow type substrate in this regard. The length (total length) Lw of the partition walls 14 in the X direction is not particularly limited, and may be generally about 50 to 500 mm, for example, 100 to 200 mm Here, in this specification, the volume of the substrate 10 means an apparent volume of the substrate. Therefore, the volume of the substrate 10 includes the volume of the cell 12 in addition to the substantial volume of the honeycomb structure (including the partition wall 14) as the framework.

As shown in FIG. 3, the catalyst layer 20 includes a palladium (Pd) layer 21, a platinum (Pt) layer 22, and a rhodium (Rh) layer 23. All of these catalyst layers 20 are disposed on the surface of the partition wall 14. The Pd layer 21 contains palladium (Pd) as a precious metal catalyst and an alloy mainly composed of Pd. The Pt layer 22 contains platinum (Pt) as a precious metal catalyst and an alloy mainly composed of Pt. The Rh layer 23 contains rhodium (Rh) as a precious metal catalyst and an alloy mainly composed of Rh. These catalyst layers 20 may contain other metal catalysts in addition to the above precious metal catalysts. Examples of such metal catalysts include platinum group catalysts such as Rh, Pd, Pt, ruthenium (Ru), osmium (Os), iridium (Ir), and alloys thereof, and in addition to these platinum group elements or in place of them, for example, metals including metallic elements such as iron (Fe), cobalt (Co), nickel (Ni), copper (Cu), silver (Ag), and gold (Au) or alloys thereof. However, the amount of Pd, Pt, and Rh in the metal catalysts contained in the Pd layer 21, the Pt layer 22, and the Rh layer 23 is 80 mass % or more, preferably 90 mass % or more, more preferably 95 mass % or more, and particularly preferably substantially 100 mass %, respectively. Naturally, inclusion of other metal catalysts that are inevitably incorporated is acceptable.

The Pd layer 21 and the Pt layer 22 have particularly high activity as an oxidation catalyst, and in the catalyst body 5, they exhibit a strong oxidizing action particularly for CO and HC among harmful components in the exhaust gas. The Rh layer 23 has particularly high activity as a reduction catalyst, and in the catalyst body 5, it exhibits a strong reduction action particularly for NOx among harmful components in the exhaust gas. The catalyst body 5 can have a function as a three-way catalyst by including the Pd layer 21, the Pt layer 22, and the Rh layer 23.

Here, when the platinum group catalyst (platinum group metals: PGM) is exposed to an oxidizing atmosphere, it easily binds to oxygen, and loses its catalytic activity. This is called "oxygen poisoning," and for example, Pd, Pt, and Rh are stabilized as oxides (PdO, PtO, and Rho). The activity of poisoned Pd, Pt, and Rh is recovered from when the atmosphere is reduced by returning it again to an equilibrium or a reducing atmosphere. Therefore, the three-way catalyst is mainly used for purifying the exhaust gas of the internal combustion engine 2 which burns in a stoichiometric state, which is a theoretical air fuel ratio.

However, even in the stoichiometric type internal combustion engine 2, when F/C control or the like is performed, the air-fuel ratio increases, the exhaust gas contains an excessive amount of oxygen, and the catalyst in the catalyst body 5 is easily poisoned. In addition, as described above, in I/S control, hybrid vehicles and the like, since the operation of the internal combustion engine 2 is frequently stopped, the temperature of the exhaust gas sent to the catalyst body 5 tends to decrease, and the activity of the catalyst in the catalyst body 5 may decrease.

In addition, for example, HC discharged from the internal combustion engine using gasoline as a fuel are mainly composed of components as aromatic components, olefins, and paraffins that readily combust at relatively low temperatures. Therefore, in the exhaust gas purification catalyst used in the internal combustion engine 2 using gasoline as a fuel, HC can be easily oxidized. For example, even if F/C control is performed, when the temperature of the exhaust gas reaches about 300° C. or higher, a poisoned platinum group catalyst can be recovered to a highly active state (metal state) at an early stage since the HC is decomposed while consuming the oxygen of the poisoned platinum group catalyst. On the other hand, for example, in the stoichiometric type internal combustion engine 2 that uses natural gas as a fuel, the exhaust gas contains 80% or more of methane, which is chemically stable and unlikely to be decomposed, as HC. Therefore, when F/C control is performed, even if the exhaust gas is heated to about 300° C., HC (methane) is not decomposed, and contaminating methane is released into the atmosphere. In addition, recovery of the poisoned platinum group catalyst can be delayed. This can be an important issue in the spread of natural gas automobiles (CNG automobiles) which have been focused on in recent years because the $CO_2$ discharge amount per unit distance is small.

Here, in the present technology, characteristics of the Pd layer 21, the Pt layer 22, and the Rh layer 23 have been examined in detail, and purification characteristics of methane according to these catalyst layers 20 are found as follows. That is, the Pt layer 22 can exhibit particularly high purification performance with respect to methane in the exhaust gas discharged from the internal combustion engine burned in a stoichiometric state, which is the theoretical air fuel ratio. Comparing the Pt layer 22, the Pd layer 21 can exhibit high methane removal performance with respect to the exhaust gas from the internal combustion engine 2 burned under a wide range of conditions from the stoichiometric state to the lean state. In addition, the Pd layer 21 allows appropriate adjustment from a lean state to a stoichiometric state of the exhaust gas by an oxidation reaction. In addition, the Rh layer 23 is laminated with the Pd layer 21 and the Pt layer 22, and thereby it is possible to improve the purification performance of the Pd layer 21 and the Pt layer 22. Based on the above, in the present technology, the arrangement of the Pd layer 21, the Pt layer 22, and the Rh layer 23 on the substrate 10 is set as follows.

The Pd layer 21 extends from the first end part 10a which is an end part on the side into which the exhaust gas in the substrate 10 flows to the second end part 10b which is an end part on the side from which an exhaust gas flows out. The Pd layer 21 may be directly provided on the surface of the partition walls 14, and, for example, may be provided on an another layer such as the Rh layer 23 and the Pt layer 22, or may be provided below another layer such as the Rh layer 23 and the Pt layer 22. Here, regarding the terms "upper" and "lower" with respect to the lamination, the direction toward the partition walls 14 in the direction perpendicular to the surface of the partition walls 14 is "lower," and the direction away from the partition walls 14 is "upper." The Pd layer 21 is disposed on the front side of the catalyst body 5, and thereby it is possible to reduce the adverse effect on the methane removal performance of the catalyst body 5 due to the change in the operation conditions of the internal combustion engine 2 and bring the atmosphere on the rear side closer to the stoichiometric state. In order for the above action to be sufficiently exhibited, when the total length Lw of the substrate 10 is 100%, the length $L_{21}$ of the Pd layer 21 may be a length of 25% or more from the first end part 10a, 30% or more, 35% or more, typically 40% or more, for example, 45% or more. However, inclusion of an excess amount of the Pd layer 21 can prevent the Pt layer 22 from sufficiently functioning. Therefore, the length $L_{21}$ of the Pd layer 21 may be generally 85% or less from the first end part 10a, 80% or less, 75% or less, typically 70% or less, 65% or less, for example, 60% or less.

Here, the amount of Pd in the Pd layer 21 is not particularly limited, for example, and the amount (hereinafter referred to as a "concentration" for the catalyst) per 1 liter (L) of the volume of the substrate in a portion in which the Pd layer 21 is formed in the first direction X is appropriately 0.1 g/L or more, preferably 0.5 g/L or more, and may be, for example, 1 g/L or more, and particularly 2 g/L or more. An excess content of Pd is not preferable because it can lead to Pd movement and aggregation. The concentration of Pd is appropriately 8 g/L or less and preferably 7 g/L or less, and may be, for example, 6 g/L or less.

The Pt layer 22 extends from the second end part 10b which is an end part on the side from which the exhaust gas in the substrate 10 flows out to the first end part 10a which is an end part on the side into which the exhaust gas flows. The Pt layer 22 may be directly provided on the surface of the partition walls 14, and, for example, may be provided on another layer such as the Rh layer 23 and the Pd layer 21. As described above, the Pd layer 21 is disposed on the front side, the Pt layer 22 is disposed on the rear side adjusted so that it is closer to the stoichiometric state, and thus it is possible to fully exhibit its high methane removal performance. The length $L_{22}$ of the Pt layer 22 is essentially unlimited. However, in order to dispose an appropriate amount of the Pd layer 21 on the front side, when the total length Lw of the substrate 10 is 100%, the length may be generally 90% or less from the second end part 10b, 85% or less, 80% or less, typically 75% or less, for example, 70% or less. On the other hand, it is desirable that as much of the Pt layer 22 as possible be disposed thereon in order that high methane removal performance be exhibited in the stoichiometric state. Therefore, the length $L_{22}$ of the Pt layer 22 may be a length of 20% or more from the second end part 10b, 25% or more, 30% or more, 35% or more, typically 40% or more, and may be, for example, 45% or more, and preferably 50% or more (exceeds 50%).

Here, the amount of Pt in the Pt layer 22 is not particularly limited, and for example, the concentration of Pt is appropriately 0.1 g/L or more and preferably 0.5 g/L or more, and may be, for example, 1 g/L or more, and particularly 2 g/L or more. An excess content of Pt is not preferable because it can lead to Pt movement and aggregation. The concentration of Pt is appropriately 8 g/L or less and preferably 7 g/L or less, and may be, for example, 6 g/L or less.

Here, as described above, the action of the Pd layer 21 disposed on the front side of the Pt layer 22 with respect to the Pt layer 22 is important in order to suitably exhibit the function of the Pt layer 22. In consideration of this, the ratio A/B of the molar amount A of Pd contained in the unit volume of the substrate 10 to the molar amount B of Pt contained in the unit volume of the substrate 10 may be about 1 or more, is preferably 1.2 or more, more preferably 1.5 or more, and may be, for example, 1.75 or more or 2 or more. However, if the ratio A/B is too large, this is not preferable because the balance between the molar amount A of Pd and the molar amount B of Pt contained in the unit volume collapses, and Pd and Pt cannot cooperate favorably. In consideration of this, the ratio A/B may be about 3 or less, is preferably 2.8 or less, and may be, for example, 2.5 or less or 2.3 or less.

At least one layer of the Pd layer 21 and the Pt layer 22 is provided over the total length Lw of the substrate 10 in the first direction X. In other words, a total $(L_{21}+L_{22})$ of the length $L_{21}$ of the Pd layer 21 and the length $L_{22}$ of the Pt layer 22 is preferably 100%×Lw or more. Thereby, methane can be removed by fully using the substrate 10. The overlap $(L_{21}+L_{22}-Lw)$ between the Pd layer 21 and the Pt layer 22 is preferably 2% or more, preferably 5% or more, more preferably 10% or more, and particularly preferably 15% or more when the total length Lw of the substrate 10 is 100%. Thereby, the Pd layer 21 and the Pt layer 22 can be made to cooperate better. However, excessive overlap is not preferable because it can lead to excessive arrangement of the Pd layer 21. In addition, inclusion of an excess amount of catalyst layer 20 is not preferable because the methane catalyst performance may not be able to be improved according to the amount of the catalyst layer 20 and weight reduction and reduction in costs tend to be hindered. Therefore, the overlap $(L_{21}+L_{22}-Lw)$ between the Pd layer 21 and the Pt layer 22 may be, for example, about 50% or less, 45% or less or 40% or less.

The Rh layer 23 is disposed so that it is laminated on both the Pd layer 21 and the Pt layer 22. As long as the Rh layer 23 is laminated on the Pd layer 21 and the Pt layer 22 in the thickness direction (vertical direction), other conditions are not particularly limited. The Rh layer 23 may be directly provided on the surface of the partition walls 14, and, for example, may be provided on another layer such as the Pd layer 21 and the Pt layer 22, or may be provided below another layer such as the Pd layer 21 and the Pt layer 22. Since the Rh layer 23 is laminated at least partially on both the Pd layer 21 and the Pt layer 22, it is possible to further improve methane removal performance of the Pd layer 21 and the Pt layer 22. For example, in a state in which the air-fuel ratio is slightly rich, the methane removal rate can be 80% or more, preferably 90% or more, and can be increased to, for example, 100%. In particular, the Pt layer 22 is disposed in combination with the Rh layer 23, and thereby it is possible to exhibit high methane removal performance (for example, methane removal rate 100%) under a wider range of air-fuel ratio conditions. In order for the action to be sufficiently exhibited and to provide favorable bonding to the Pd layer 21 and the Pt layer 22, when the total length Lw of the substrate 10 is 100%, the length $L_{23}$ of the Rh layer 23 may be about 50% or more of the length, 55% or more, 60% or more, typically 65% or more, 70% or more, for example, 80% or more. The upper limit of the length $L_{23}$ of the Rh layer 23 is not particularly limited, and may be, for example, 100%, 100% or less, 95% or less, or 90% or less.

Here, the amount of Rh in the Rh layer 23 is not particularly limited, for example, the concentration of Rh is appropriately 0.01 g/L or more and preferably 0.03 g/L or more, and may be, for example, 0.05 g/L or more or 0.1 g/L or more. An excess content of Rh is not preferable because methane catalyst performance may not be able to be improved according to the amount of Rh added, and reduction in costs tends to be hindered. The concentration of Rh is, for example, appropriately 3 g/L or less, and preferably 2 g/L or less, and may be, for example, 1 g/L or less.

The catalyst layer 20 can include a carrier supporting these catalysts in addition to precious metal catalysts contained in each of the Pd layer 21, the Pt layer 22, and the Rh layer 23. Regarding such carriers, carriers (typically, powders) known to be usable for this type of application in the related art can be appropriately used. For example, preferable examples of carriers include metal oxides such as alumina ($Al_2O_3$), rare earth metal oxides, alkaline metal oxides, alkaline earth metal oxides, ceria ($CeO_2$), zirconia ($ZrO_2$), silica ($SiO_2$), magnesia (MgO), and titania ($TiO_2$), and solid solutions thereof, for example, ceria-zirconia composite oxides (CZ composite oxide: $CeO_2$—$ZrO_2$). These may be used alone or two or more thereof may be used in combination. Among these, it is preferable to use at least one of alumina and CZ composite oxides. The carrier may be a polycrystal or a single crystal.

The shape (outer shape) of the carrier is not particularly limited, and a powder carrier is preferably used in order to secure a larger specific surface area. For example, the average particle size of the carrier (the average particle size measured by a laser diffraction/scattering method) is, for example, 20 μm or less, typically 10 μm or less, and preferably, for example, 7 μm or less. If the average particle size of the carrier is too large, this is not preferable because the dispersibility of the precious metal supported on the carrier tends to decrease, and the purification performance of the catalyst deteriorates. The average particle size may be, for example, 5 μm or less, typically 3 μm or less. On the other hand, if the average particle size of the carrier is too small, this is not preferable because the heat resistance of the carrier itself formed of the carrier decreases and thus the heat resistance of the catalyst decreases. Therefore, it is usually preferable to use a carrier having an average particle size of about 0.1 μm or more, for example, 0.5 μm or more.

The amount of the precious metal catalyst supported on the carrier is not particularly limited. For example, the amount is appropriately in a range of 0.01 mass % to 10 mass % (for example, 0.05 mass % to 8 mass %) with respect to a total mass of the carrier. If the amount of the catalytic metal supported is too small, the catalytic activity obtained by the catalytic metal may be insufficient. On the other hand, if the amount of the catalytic metal supported is too large, the catalytic metal tends to cause grain growth, and at the same time, this is disadvantageous in terms of cost. In addition, a method of supporting the precious metal on the carrier is not particularly limited. For example, a carrier powder containing alumina or a CZ composite oxide is impregnated with an aqueous solution containing a salt including a precious metal catalyst element (for example, nitrate) or a precious metal complex (for example, tetraammine complex), and then dried and fired for preparation.

The catalyst layer 20 may appropriately contain an optional component in addition to a precious metal catalyst and the carrier of the precious metal catalyst. Examples of such an optional component include a co-catalyst in which a metal catalyst is not supported, an oxygen storage material having an oxygen storage capacity (OSC material), a $NO_x$ adsorbent having a $NO_x$ storage capacity, and a stabilizer. Examples of co-catalysts include alumina and silica. Examples of OSC materials include ceria, ceria-containing composite oxides, for example, CZ composite oxides.

Examples of stabilizers include rare earth elements such as lantern (La) and yttrium (Y), alkaline earth elements such as calcium (Ca) and barium (Ba), and other transition metal elements. Typically, these elements in the form of oxides are present in the catalyst layer. Among these, rare earth elements such as lantern and yttrium are suitably used as stabilizers because they can increase a specific surface area at a high temperature without impairing the catalyst function. Such carriers can be a polycrystal or a single crystal. Among the catalyst layers 20, the Pd layer 21 containing an oxidation catalyst preferably contains a stabilizer, for example, a barium element. Thereby, poisoning of the oxidation catalyst is suitably minimized and the catalytic activity can be improved. In addition, the dispersibility of the oxidation catalyst is improved, and the grain growth of the oxidation catalyst can be suppressed at a higher level.

The each of the coating amounts of the Pd layer 21, the Pt layer 22, and the Rh layer 23 is not particularly limited. In order to increase the fluidity of the exhaust gas in the partition wall 14 and reduce the pressure loss, the concentration for each layer is generally 200 g/L or less, preferably 180 g/L or less, for example, 150 g/L or less per 1 L of the volume of the substrate. On the other hand, in order to further improve purification performance of methane and other exhaust gases, the concentration for each layer is generally 10 g/L or more, preferably 30 g/L or more, for example, 50 g/L or more per 1 L of the volume of the substrate. When the above range is satisfied, it is possible to achieve both reduction of the pressure loss and improvement of exhaust gas purification performance at a higher level.

Moreover, the ratio of the coating amounts of the Pd layer 21 and the Pt layer 22 is not particularly limited, and in order to reduce the pressure loss more favorably, for example, Pd layer:Pt layer=30 to 70:70 to 30 may be employed. In the technology disclosed here, although the coating amount of the catalyst layer per 1 L of the volume of the substrate is the same, it is possible to further improve purification performance than in the related art. Here, the coating amount of the catalyst layer 20 means the mass of the catalyst layer 20 contained in the substrate per unit volume. However, regarding the volume of the substrate, only the substrate of a portion in which the catalyst layer 20 is formed in the first direction X is considered, and the substrate of a portion in which the catalyst layer 20 is not formed is not considered.

Here, the catalyst body 5 having the above configuration can be produced by, for example, the following method. First, the substrate 10 and a slurry for forming the catalyst layer 20 are prepared. Regarding the slurry, a Pd layer-forming slurry, a Pt layer-forming slurry, and a Rh layer-forming slurry are prepared. These catalyst layer-forming slurries contain metal catalyst components that are different from each other (typically a solution containing a metal catalyst as ions) as essential components, and each of them may contain other optional components, for example, a carrier, a co-catalyst, an OSC material, a binder, and various additives. Here, regarding the binder, an alumina sol, a silica sol, or the like can be used. Moreover, the properties (a viscosity, a solid content ratio, etc.) of the slurry may be appropriately adjusted according to the size of the substrate 10 used, the form of the cell 12 (the partition wall 14), desired properties of the catalyst layer 20, and the like.

For example, the average particle size of particles in the slurry can be about 1 μm or more, preferably 2 μm or more, more preferably 3 μm or more, and can be about 30 μm or less, preferably 20 μm or less, and more preferably 10 μm or less.

Next, the prepared catalyst layer-forming slurry is flowed into the cell 12 from the end part of the substrate 10, and is supplied to a predetermined length in the X direction. When the Pd layer 21 is formed, the slurry is flowed from the first end part 10a, and supplied to the length $L_{21}$ in the X2 direction. When the Pt layer 22 is formed, the slurry is flowed from the second end part 10b and supplied to the length $L_{22}$ in the X1 direction. When the Rh layer 23 is formed, the slurry may flow from either the first end part 10a or the second end part 10b, and may be supplied to a desired length:$L_{23}$. In this case, the slurry may be suctioned from the end part on the opposite side. In addition, an excess slurry may be discharged by blowing air from the end part on the opposite side. Then, whenever one slurry is supplied, the substrate 10 to which the slurry is supplied is dried and fired at a predetermined temperature for a predetermined time. Thus, the particulate raw material is sintered and the porous catalyst layer 20 is formed. The drying and firing method may be the same as those when a conventional catalyst layer is formed. As shown in test examples to be described below, the Pd layer 21, the Pt layer 22, and the Rh layer 23 can be formed, for example, in order from the layers disposed below so that a desired catalyst layer structure can be obtained. Thereby, the catalyst layer 20 can be formed on the surface of the partition wall 14 of the substrate 10.

According to the catalyst body 5 having the above configuration, the exhaust gas discharged from the internal combustion engine 2 flows into the cell 12 from the first end part 10a of the substrate 10. The exhaust gas which has flowed into the cells 12 passes through the catalyst layer 20 formed on the surface of the partition walls 14 and is discharged from the second end part 10b. Here, at least the Pd layer 21 is disposed on the upstream side of the catalyst layer 20. In addition, the Rh layer 23 is laminated on at least a part of the Pd layer 21. Therefore, for example, even when the exhaust gas is outside of the stoichiometric state, harmful components containing methane are removed from the exhaust gas when passing through the Pd layer 21, and the atmosphere is brought closer to a stoichiometric state. In addition, the exhaust gas that has passed through the Pd layer 21 on which the Rh layer 23 is laminated passes through the Pt layer 22 on which the Rh layer 23 is laminated. Since the exhaust gas that has reached the Pt layer 22 and the Rh layer 23 is brought closer to a stoichiometric state, harmful components containing methane are removed from the exhaust gas at a high removal rate while passing through the Pt layer 22 on which the Rh layer 23 is laminated. In addition, since the Rh layer 23 is provided, NOx components in the exhaust gas are also removed. Thereby, the exhaust gas from which harmful components are removed is discharged from the end part 10b on the exhaust gas outflow side to the outside of the catalyst body 5.

While test examples related to the present invention will be described below, the present invention is not intended to be limited to what is shown in the following test examples.

Reference Example

Methane ($CH_4$) was removed using a catalyst body having a catalyst layer containing PGM alone, and thus the methane removal performance for each catalyst layer containing each precious metal catalyst was confirmed.

First, as a substrate, as shown in FIG. 2, an open flow (straight honeycomb) type cordierite substrate (an outer diameter of 120 mm, a total length of 115 mm, a bulk volume of 1.3 L, and a number of cells of 600 cpsi (cells/in$^2$)) was prepared.

In addition, slurries for forming a Pd layer, a Pt layer, and a Rh layer as catalyst layers on the substrate were prepared. Specifically, a palladium nitrate aqueous solution, alumina powder ($\gamma$-$Al_2O_3$), ceria zirconia composite oxide powder (CZ), and an alumina sol were mixed in deionized water to prepare a Pd slurry. In addition, a platinum nitrate aqueous solution, alumina powder ($\gamma$-$Al_2O_3$), ceria zirconia composite oxide powder (CZ), and an alumina sol were mixed in deionized water to prepare a Pt slurry. A rhodium nitrate aqueous solution, alumina powder ($\gamma$-$Al_2O_3$), ceria zirconia composite oxide powder (CZ), and an alumina sol were mixed in deionized water to prepare a Rh slurry.

Next, any of the prepared Pd slurry, Pt slurry, and Rh slurry was supplied from the end of the cordierite substrate, and then suctioned at a predetermined airflow speed from the same end, and thus the slurry was wash-coated on the entire surface (a total length in the length direction) of the partition wall of the substrate. Next, the coating layer was dried at 100° C. and then fired at 500° C. to prepare a catalyst body having a Pd layer, a Pt layer, or a Rh layer alone. Here, the slurry composition and the catalyst coating amount were adjusted so that the PGM concentration in the catalyst body was 3.0 g/L for the Pd layer, 3.0 g/L for the Pt layer, and 0.15 g/L for the Rh layer.

In addition, the Pd slurry or the Pt slurry was wash-coated on the cordierite substrate and dried and fired in the same manner as above to form a Pd layer or a Pt layer on the entire surface of the partition wall. Next, the Rh slurry was additionally wash-coated on each substrate and dried and fired in the same manner as above to prepare a catalyst body having a Pd layer-Rh layer or a Pt layer-Rh layer. Here, the PGM concentration in the catalyst body was adjusted to 3 g/L for the Pd layer or the Pt layer and 0.15 g/L for the Rh layer.

(Evaluation of Exhaust Gas Purification Performance)

For each of the prepared catalyst bodies, the methane removal rate in the simulated exhaust gas of a natural gas (CNG) vehicle was examined using a catalyst evaluation device. The catalyst evaluation device included a mass flow controller, a heating furnace, an $O_2$ sensor, and an engine exhaust gas analyzer, and could generate an engine exhaust gas in a simulative manner and could analyze components of a gas inflowing into a catalyst body and a gas outflowing from a catalyst body. Specifically, the gas components shown in the following Table 1 were mixed in a catalyst evaluation device at a predetermined ratio, and an exhaust gas of a CNG vehicle was generated in a simulative manner. As shown in Table 1, in the simulated exhaust gas, the oxygen concentration was changed, and thereby the ratio ($\lambda$) of the oxidizing gas component to the reducing gas component was changed from rich (0.9) to lean (1.1). Here, the ratio of the oxidizing gas component to the reducing gas component indicated that $\lambda=1$ was stoichiometric and the amount of the oxidizing gas was the same as the amount of the reducing gas. Then the above gas was supplied to the catalyst body at 500° C., and the methane removal rate of the catalyst body was measured. The methane removal rate was obtained by measuring a methane concentration P1 of the simulated exhaust gas flowing into the catalyst body and a methane concentration P2 of the simulated exhaust gas flowing out from the catalyst body and calculating the following formula: methane removal rate (%)=[(P1−P2)/P1]×100 therefrom. The results are shown in FIG. 4(a) and FIG. 4(b).

TABLE 1

| Set of conditions | $CO_2$ (vol %) | $O_2$ (vol %) | CO (ppm) | NO (ppm) | $H_2$ (ppm) | $CH_4$ (ppm) | $H_2O$ (vol %) | $N_2$ | Total flow rate (ml/min) |
|---|---|---|---|---|---|---|---|---|---|
| 1 | 14 | 0.000 | 15,000 | 1,000 | 5,000 | 1,650 | 11 | Balance | 20,000 |
| 2 | | 0.555 | | | | | | | |
| 3 | | 0.835 | | | | | | | |
| 4 | | 1.150 | | | | | | | |
| 5 | | 1.390 | | | | | | | |
| 6 | | 2.225 | | | | | | | |
| 7 | | 5.555 | | | | | | | |

Figure 4A:
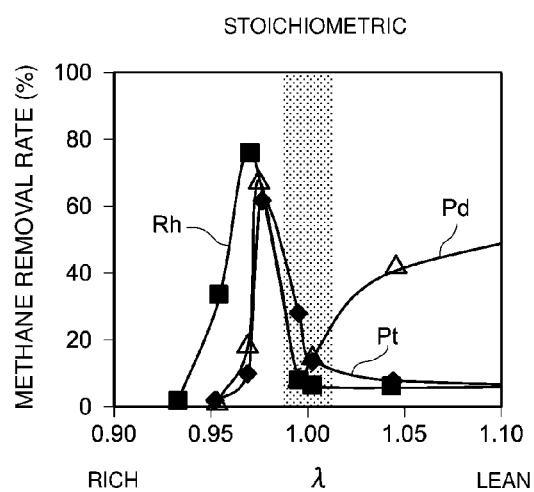
FIG. 4 shows graphs showing the relationship between a ratio (λ) of an oxidizing gas component to a reducing gas component in a simulated exhaust gas and a methane removal rate for a single catalyst layer (a) and a laminated catalyst layer (b).
Figure 4B:
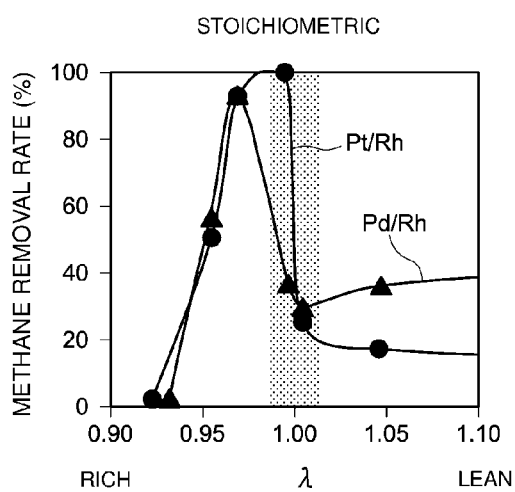

FIG. 4(a) is a graph showing the relationship between the ratio ($\lambda$) of the oxidizing gas component to the reducing gas component in the simulated exhaust gas and the methane removal rate for catalyst bodies each having a Pd layer, a Pt layer, and a Rh layer alone. Regarding methane removal, it was confirmed that the Pd layer, the Pt layer, and the Rh layer had different purification characteristics. That is, the Pt layer generally exhibited high methane removal performance in the stoichiometric state ($\lambda=1.0$), but had low methane removal performance in the rich state and the lean state. On the other hand, the Pd layer had low methane removal performance in the rich state, but it exhibited high methane removal performance in the lean state in addition to the stoichiometric state. In addition, it was found that the Rh layer had low methane removal performance in the lean state, but it exhibited high methane removal performance in the stoichiometric state to the rich state.

FIG. 4(b) is a graph showing the relationship between the ratio ($\lambda$) of the oxidizing gas component to the reducing gas component in the simulated exhaust gas and the methane removal rate for catalyst bodies each having a Pd layer-Rh layer and a Pt layer-Rh layer. Regarding methane removal, it was found that the methane removal performance was improved by laminating the Pd layer-Rh layers or the Pt layer-Rh layers in combination compared with when the Pd layer, the Pt layer, or the Rh layer was used alone. It was confirmed that the Pd layer-Rh layer and the Pt layer-Rh layer could achieve a methane removal rate of approximately 100% in the stoichiometric state. In particular, it was confirmed that the Pt layer-Rh layer exhibited high methane removal performance of about 100% under a wide range of conditions of $\lambda=0.96$ to 1.0, and the Pd layer-Rh layer had excellent methane removal performance in the lean state.

In the exhaust gas purification catalyst, the change in the atmosphere according to engine operation conditions was larger on the rear side than the front side. For example, in a stoichiometric direct injection vehicle, due to F/C control, I/S control or the like in the engine, the front side is often exposed to a lean atmosphere. In addition, on the rear side, due to the progress of the catalytic reaction with the catalyst layer disposed on the front side, there is less change in the atmosphere, and adjustment to closer to a stoichiometric state in the atmosphere can be performed in many cases. Therefore, it can be said that, when the Pd layer-Rh layer was disposed on the front side of the exhaust gas purification catalyst and the Pt layer-Rh layer was disposed on the rear side, higher methane removal performance could be exhibited under a wider range of atmosphere conditions.

Test Example 1

Methane ($CH_4$) was removed using catalyst bodies with different arrangements while the amounts of catalytic metals used in the Pd layer, the Pt layer, and the Rh layer as catalyst layers were the same, and thus a difference in methane removal performance depending on the arrangement of the catalyst layers was confirmed.

First, as a substrate, an open flow (straight honeycomb) type cordierite substrate (an outer diameter of 120 mm, a total length of 115 mm, a bulk volume of 1.3 L, and a number of cells of 600 cpsi (cells/in$^2$)), which was the same as that used in Reference example was prepared.

In addition, slurries for forming a Pd layer, a Pt layer, and a Rh layer as catalyst layers on the substrate were prepared. Specifically, a palladium nitrate aqueous solution, alumina powder ($\gamma$-$Al_2O_3$), ceria zirconia composite oxide powder (CZ), and an alumina sol were mixed in deionized water to prepare a Pd slurry. In addition, a platinum nitrate aqueous solution, alumina powder ($\gamma$-$Al_2O_3$), ceria zirconia composite oxide powder (CZ), and an alumina sol were mixed in deionized water to prepare a Pt slurry. A rhodium nitrate aqueous solution, alumina powder ($\gamma$-$Al_2O_3$), ceria zirconia composite oxide powder (CZ), and an alumina sol were mixed in deionized water to prepare a Rh slurry.

Figure 5:
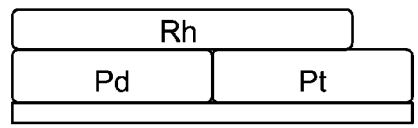
FIG. 5 shows partial cross-sectional views schematically illustrating configurations of catalyst layers of examples.
Figure 5:
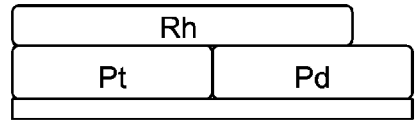
Figure 5:
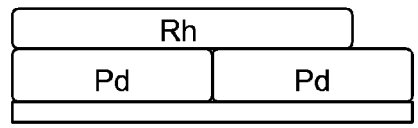
Figure 5:
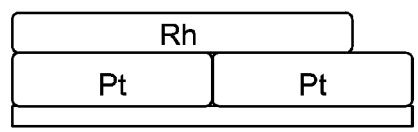
Figure 5:
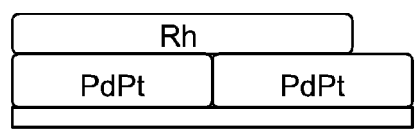
Figure 5:
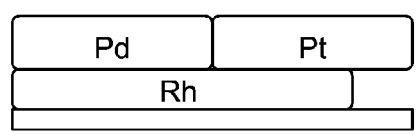
Figure 5:
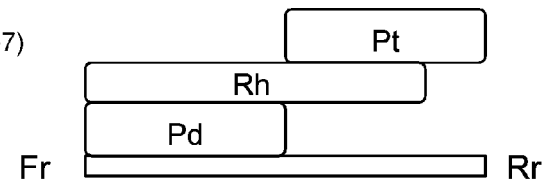

Next, as shown in FIG. 5 and the following Table 2, the Pd layer, the Pt layer, and the Rh layer as catalyst layers were formed with different arrangements to prepare catalyst bodies of Examples 1-1 to 1-7. The Pd layer, the Pt layer, and the Rh layer were all formed by wash coating and drying and burning for each layer according to the same suction method as in the above reference example.

TABLE 2

|  | First layer | | | | Second layer | | | |
| --- | --- | --- | --- | --- | --- | --- | --- | --- |
|  | Fr side | | Rr side | | Fr side | | Rr side | |
| Example | Type of PGM | Concentration of PGM (g/L) | Type of PGM | Concentration of PGM (g/L) | Type of PGM | Concentration of PGM (g/L) | Type of PGM | Concentration of PGM (g/L) |
| 1-1 | Pd | 3 | Pt | 3 | Rh | 0.15 | Rh$^x$ | 0.15 |
| 1-2 | Pt | 3 | Pd | 3 | Rh | 0.15 | Rh$^x$ | 0.15 |
| 1-3 | Pd | 3 | Pd | 3 | Rh | 0.15 | Rh$^x$ | 0.15 |
| 1-4 | Pt | 3 | Pt | 3 | Rh | 0.15 | Rh$^x$ | 0.15 |
| 1-5 | Pd + Pt | 3 | Pd + Pt | 3 | Rh | 0.15 | Rh$^x$ | 0.15 |
| 1-6 | Rh | 0.15 | Rh* | 0.15 | Pd | 3 | Pt | 3 |
| 1-7 | Pd | 3 | Rh* | 0.15 | Rh | 0.15 | Pt | 3 |

Example 1-1

That is, the Pd slurry was supplied over half a length (½×Lw) from the front side end of the substrate and then suctioned at a predetermined airflow speed, dried at 100° C. and then fired at 500° C., and thereby a first Pd layer was formed. Next, the Pt slurry was supplied over half a length (½×Lw) from the rear side of the substrate and then suctioned at a predetermined airflow speed, dried at 100° C. and then fired at 500° C., and thereby a first Pt coating layer was formed. Then, the Rh slurry was supplied over a length of 80% (0.8×Lw) from the front side of the substrate and then suctioned at a predetermined airflow speed, dried at 100° C. and then fired at 500° C., and thereby a second Rh coating layer was formed. Thereby, a catalyst body of Example 1-1 was obtained. The concentration of the catalyst per unit volume of the substrate in the first Pd layer and Pt layer was 3 g/L. For the second Rh coating layer, the concentration of the catalyst per unit volume of the substrate in a portion in which the Rh layer was formed in the length direction of the substrate was 0.15 g/L. In Table 2, the position indicated by "Rh*" means that only 30%/50% of the Rh layer was formed. Hereinafter, unless otherwise specified, conditions for forming the catalyst layer by the suction method are the same as in this example.

Example 1-2

A catalyst body of Example 1-2 was obtained in the same manner as in Example 1-1 except that the slurry supplied to the front side of the substrate in the first layer was changed to the Pt slurry and the slurry supplied to the rear side was changed to the Pd slurry.

Example 1-3

A catalyst body of Example 1-3 was obtained in the same manner as in Example 1-1 except that both the slurry supplied to the front side of the substrate in the first layer and the slurry supplied to the rear side were changed to the Pd slurry.

Example 1-4

A catalyst body of Example 1-4 was obtained in the same manner as in Example 1-1 except that both the slurry supplied to the front side of the substrate in the first layer and the slurry supplied to the rear side were changed to the Pt slurry.

Example 1-5

The prepared Pd slurry and Pt slurry were mixed in equal amounts to prepare a Pd/Pt mixture slurry. A catalyst body of Example 1-5 was obtained in the same manner as in Example 1-1 except that both the slurry supplied to the front side of the substrate in the first layer and the slurry supplied to the rear side were changed to the Pd/Pt mixture slurry.

Example 1-6

The Rh slurry was supplied over a length of 80% (0.8×Lw) from the front side end of the substrate and dried and fired, and thereby a first Rh layer was formed. Next, the Pd slurry was supplied over half a length (½×Lw) from the front side of the substrate and dried and fired, and thereby a second Pd layer was formed. Then, the Pt slurry was supplied over half a length (½×Lw) from the rear side of the substrate and dried and fired, and thereby a second Pt layer was formed. Thereby, a catalyst body of Example 1-6 was obtained. In the catalyst body, the first Rh layer was laminated with the second Pd layer and Pt layer over the entire length. In addition, although not reflected in FIG. 5, to facilitate understanding, a portion of the second Pt layer corresponding to a length of 20% from the rear side was disposed side by side with the first Rh layer.

Example 1-7

The Pd slurry was supplied over a length of 50% (½×Lw) from the front side of the substrate and dried and fired, and thereby a first Rd layer was formed. Next, the Rh slurry was supplied over a length of 80% (0.8×Lw) from the front side of the substrate and dried and fired, and thereby a Rh layer was formed. In addition, the Pt slurry was supplied over half a length (½×Lw) from the rear side of the substrate and dried and fired, and thereby a Pt coating layer was formed. Thereby, a catalyst body of Example 1-7 was obtained. In the catalyst body, the Rh layer was laminated with the Pd layer and the Pt layer over the entire length. In addition, although not reflected in FIG. 5, to facilitate understanding, a portion of the Rh layer corresponding to a length of 30% from the rear side was disposed side by side with the first Pd layer. That is, in Table 2, "Rh" on the front side in the second layer and "Rh*" on the rear side in the first layer are the same layer and are continuous. In addition, the Pt layer is indicated as "Pt*" in Table 2, but a portion corresponding to a length of about 30% on the front side was disposed side by side with the second Rh layer and a portion corresponding to a length of about 20% on the rear side was disposed side by side with the first Rh layer.

(Evaluation of Exhaust Gas Purification Performance)

Figure 6:
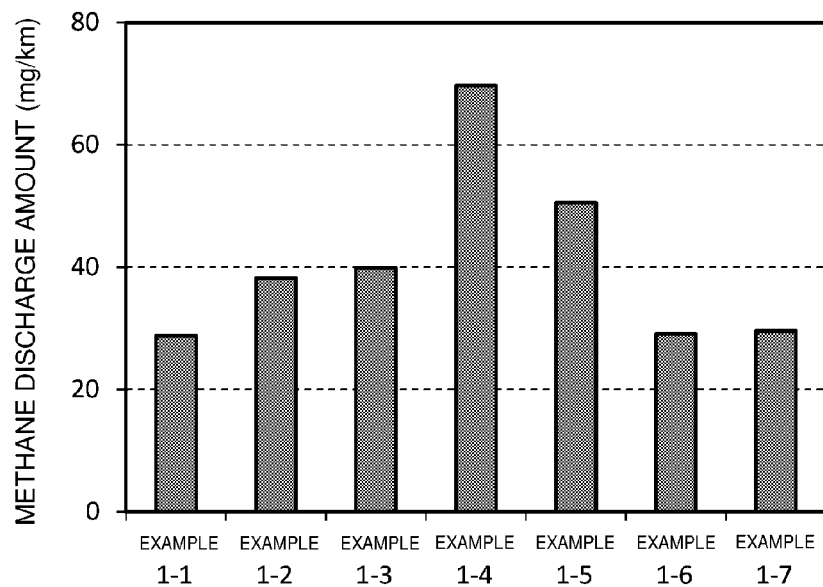
FIG. 6 is a graph showing a methane discharge rate of catalyst bodies of examples.
Figure 7:
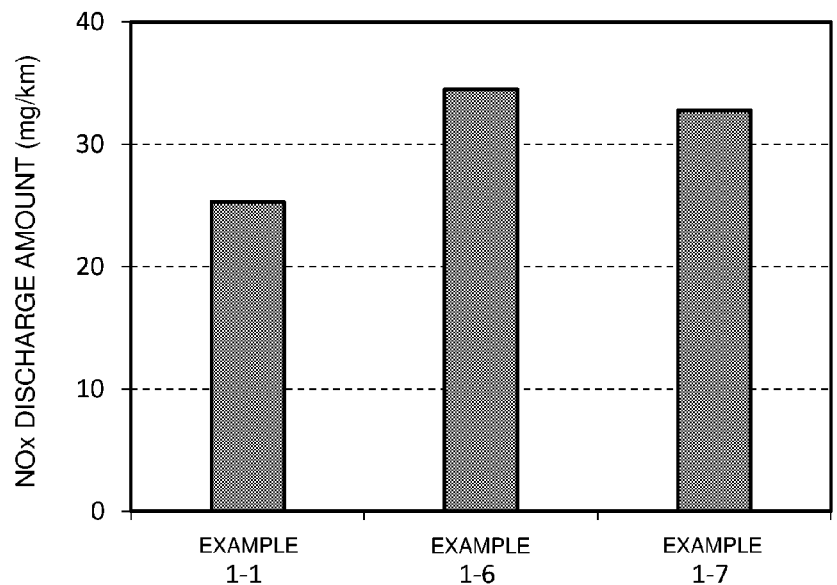
FIG. 7 is a graph showing a NOx discharge rate of catalyst bodies of examples.

For the prepared catalyst bodies of the examples, the purification performance of methane gas in a natural gas (CNG) vehicle was evaluated. Specifically, the catalyst body of each example was installed in the exhaust path of a vehicle with an in-cylinder direct injection natural gas engine that burns at a theoretical air fuel ratio (stoichiometric CNG direct injection vehicle, 1.5 L). Then, the methane and NOx discharge amount (mg/km) when this vehicle was driven according to WLTC (Worldwide harmonized Light duty Test Cycle) was measured. The methane and NOx discharge amount was calculated from the measurement results of the methane concentration and the NOx concentration in the exhaust gas discharged from the catalyst body based on the following formula. The results are shown in the following Table 3, and FIG. 6 and FIG. 7.

Methane discharge amount (mg/km)=methane concentration in exhaust gas (mg/L)×exhaust gas amount (L)÷travel distance (km)

NOx discharge amount (mg/km)=NOx concentration in exhaust gas (mg/L)×exhaust gas amount (L)÷travel distance (km)

TABLE 3

| Example | Methane discharge amount | [mg/km] NOx discharge amount |
|---|---|---|
| 1-1 | 28.8 | — |
| 1-2 | 38.2 | — |
| 1-3 | 39.9 | — |
| 1-4 | 69.7 | — |
| 1-5 | 50.5 | 25.3 |
| 1-6 | 29.1 | 34.5 |
| 1-7 | 29.6 | 32.8 |

The Pd layer exhibited high methane removal performance even in the lean state, but the Pt layer had high methane removal performance in a very limited stoichiometric state. Therefore, as can be clearly understood from comparison between Example 1-1 and Example 1-2 in Table 3 and FIG. 6, it was confirmed that, in order to reduce the methane discharge amount, regarding the Pd layer and the Pt layer, it was preferable to dispose the Pd layer on the front side and the Pt layer on the rear side. In addition, as can be clearly understood from comparison between Example 1-1 and Example 1-3, when the front side was the Pd layer, the environment on the rear side was generally improved to a stoichiometric state. Therefore, it was confirmed that it was preferable to provide the Pt layer rather than the Pd layer on the rear side in order to improve the methane removal performance.

Here, as shown in Example 1-4, it was found that, even if the Pt layer was provided on the rear side, when the Pd layer was not provided on the front side, the Pt layer on the rear side did not effectively function for methane removal. In addition, as shown in Example 1-5, when the Pd layer and the Pt layer were formed as a mixed layer, catalytic metals Pd and Pt reacted with each other during the operation of the engine and the catalytic activity deteriorated, and the methane removal performance was lowered compared with that of Example 1-3 in which only Pd was used in the first layer. Therefore, it was confirmed that it was preferable to arrange three-way catalysts Pd, Pt, and Rh in different layers.

As shown in Example 1-6 and Example 1-7, it was found that, if the Pd layer, the Pt layer, and the Rh layer were independent layers, the Pd layer was disposed on the front side, and the Pt layer was disposed on the rear side so that the Rh layer was in contact with the Pd layer and the Pt layer, the other arrangements were not particularly limited. That is, as shown in Example 1-6, it was confirmed that, even if the Rh layer was the first layer, and the Pd layer and the Pt layer were the second layer, high methane removal performance equal to that of Example 1-1 was obtained. In addition, as shown in Example 1-7, it was confirmed that, even if the Pd layer and the Pt layer were substantially separated by the Rh layer, when the Pd layer was disposed on the front side, the environment on the rear side was improved, and the Pt layer on the rear side functioned effectively. This result was an unexpected result in that the Pt layer could sufficiently contribute to methane removal even though the Pt layer was exposed to the surface on the rear side and could come into direct contact with an exhaust gas. However, as shown in Table 3 and FIG. 7, it was found that the NOx discharge amount decreased in the order of Example 1-1, Example 1-7, and Example 1-6. That is, it is thought that, if the Rh layer having excellent NOx removal performance was provided on a surface (second layer) regardless of whether it was on the front side or the rear side, the efficiency of contact with NOx increased and the NOx removal performance increased. Based on the above, it was found that, in order to achieve both the methane removal performance and the NOx removal performance at a high level, it was preferable to use the Pd layer and the Pt layer as the first layer and the Rh layer as the second layer.

Test Example 2

The arrangement of the Pd layer, the Pt layer, and the Rh layer as catalyst layers and a total amount of catalytic metals used were made constant, and methane ($CH_4$) was removed using a catalyst body in which the amount (concentration) of catalytic metals contained in the Pd layer and the Pt layer was changed, and thus a difference in the methane removal performance was confirmed. As a substrate, as in Test Example 1, an open flow (straight honeycomb) type cordierite substrate (an outer diameter of 120 mm, a total length of 115 mm, a bulk volume of 1.3 L, and a number of cells of 600 cpsi (cells/in$^2$)) was prepared.

In addition, slurries for forming a Pd layer, a Pt layer, and a Rh layer as catalyst layers on the substrate were prepared. Specifically, the Rh slurry was prepared in the same manner as in Test Example 1. Regarding the Pd slurry and the Pt slurry, the concentration of Pd in the palladium nitrate aqueous solution and the concentration of Pt in the platinum nitrate aqueous solution were changed so that the concentration of the catalysts became constant at an average of 3 g/L, and the amounts of the catalysts were shown in the following Table 4, when the coating lengths of the Pd layer and the Pt layer on the substrate were the same as in Test Example 1. That is, in the Pd slurry and the Pt slurry in Test Example 1, the same amount (mass) of Pt as the amount (mass) of Pd increased/decreased in the Pd slurry was decreased/increased in the Pt slurry. Thereby, the Pd slurry, the Pt slurry, and the Rh slurry of Examples 2-1 to 2-6 were prepared.

Figure 8:
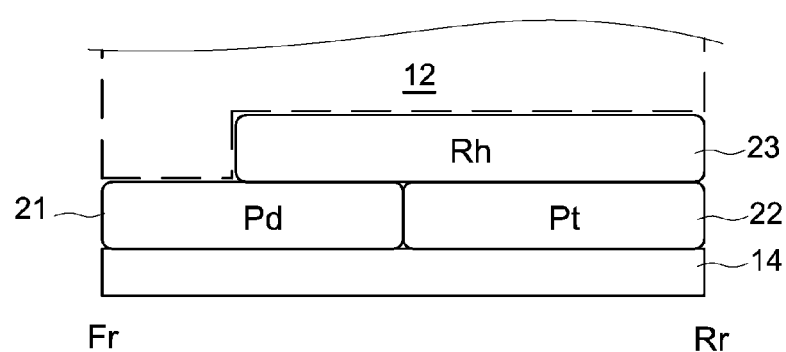
FIG. 8 is a partial cross-sectional view schematically showing a configuration of a catalyst layer in an exhaust gas purification catalyst according to another embodiment.

Next, the Pd layer, the Pt layer, and the Rh layer as catalyst layers were formed in the arrangement shown in FIG. 8. The Pd layer, the Pt layer, and the Rh layer were all formed by wash coating and drying and firing for each layer according to the same suction method as in Test Example 1.

That is, the Pd slurry was supplied over a half the length (½×Lw) from the front side end of the substrate and then suctioned at a predetermined airflow speed, dried at 100° C. and then fired at 500° C., and thereby a first Pd layer was formed. Next, the Pt slurry was supplied over a half the length (½×Lw) from the rear side of the substrate, and then suctioned at a predetermined airflow speed, dried at 100° C. and then fired at 500° C., and thereby a first Pt coating layer was formed. Then, the Rh slurry was supplied over a length of 80% (0.8×Lw) from the rear side of the substrate and then suctioned at a predetermined airflow speed, dried at 100° C. and then fired at 500° C., and thereby a second Rh coating layer was formed. Catalyst bodies of Examples 2-1 to 2-6 were obtained using the Pd slurry, the Pt slurry, and the Rh slurry of each example.

(Evaluation of Exhaust Gas Purification Performance)

For the prepared catalyst bodies of the examples, the purification performance of methane gas in a natural gas (CNG) vehicle was evaluated in the same manner as in Test Example 1. Specifically, the catalyst body of each example was installed in the exhaust path of a vehicle with an in-cylinder direct injection natural gas engine that burns at a theoretical air fuel ratio (stoichiometric CNG direct injection vehicle, 1.5 L). Then, the methane discharge amount (mg/km) when this vehicle was driven according to WLTC (Worldwide harmonized Light duty Test Cycle) was measured. The results are shown in the following Table 4 and FIG. 9.

TABLE 4

| Example | First layer | | | Second layer | Methane discharge amount (mg/km) |
| --- | --- | --- | --- | --- | --- |
| | Concentration of Pd (g/L) | Concentration of Pt (g/L) | Pd/Pt ratio (-) | Concentration of Rh (g/L) | |
| 2-1 | 3.60 | 2.40 | 2.8 | 0.5 | 35.05 |
| 2-2 | 3.10 | 2.90 | 2.0 | | 28.80 |
| 2-3 | 2.60 | 3.40 | 1.4 | | 26.44 |
| 2-4 | 2.40 | 3.60 | 1.2 | | 30.51 |
| 2-5 | 4.75 | 1.25 | 7.0 | | 44.78 |
| 2-6 | 0 | 6 | 0.0 | | 64.00 |

Figure 9:
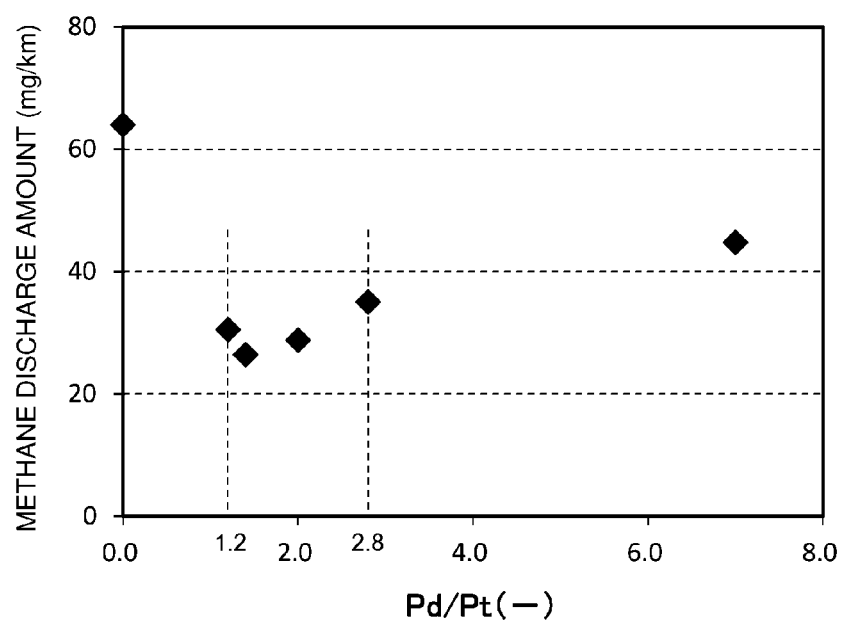
FIG. 9 is a graph showing the relationship between a Pd/Pt ratio and a methane discharge rate of catalyst bodies of examples.

As shown in FIG. 9, it was confirmed that, although the total amount (mass) of precious metal catalysts used was not changed, when the concentration of Pd in the Pd layer and the concentration of Pt in the Pt layer were changed, a large change was observed in the methane discharge amount. It was found that the methane discharge amount had a certain correlation with the ratio (Pd/Pt ratio) between the concentration of Pd in the Pd layer and the concentration of Pt in the Pt layer, and when the Pd/Pt ratio was too large or too small, the methane discharge amount increased. The Pd/Pt ratio may be adjusted to, for example, 1 or more, and it can be said that 1.2 or more or 1.5 or more was more preferable. The Pd/Pt ratio may be adjusted to, for example, 2.8 or less, and it can be said that 2.5 or less or 2 or less was more preferable.

Test Example 3

Methane ($CH_4$) was purified using a catalyst body in which the arrangement of the Pd layer, the Pt layer, and the Rh layer as catalyst layers and the concentration of catalytic metals were made constant and the coating lengths of the Pd layer and the Pt layer in the length direction of the substrate were changed, and thus a difference in the methane removal performance was confirmed. As a substrate, as in Test Example 1, an open flow (straight honeycomb) type cordierite substrate (an outer diameter of 120 mm, a total length of 115 mm, a bulk volume of 1.3 L, and a number of cells of 600 cpsi (cells/$in^2$)) was prepared. In addition, a Pd slurry, a Pt slurry, and a Rh slurry for forming the Pd layer, the Pt layer, and the Rh layer as catalyst layers were prepared in the same manner as in Test Example 1.

Then, the Pd layer, the Pt layer, and the Rh layer as catalyst layers were disposed as shown in FIG. 3, and the Pd layer and the Pt layer were formed so that the lengths thereof became the lengths shown in the following Table 5. The Pd layer, the Pt layer, and the Rh layer were all formed by wash coating and drying and firing for each layer according to the same suction method as in Test Example 1.

That is, in Examples 3-1 to 3-6, first, the Pt slurry was supplied over a length of 67% (0.67×Lw) from the rear side end of the substrate and then suctioned at a predetermined airflow speed, dried at 100° C. and then fired at 500° C., and thereby a first Pt layer was formed. Next, as shown in Table 5, the Pd slurry was supplied over a length of 35 to 90% (0.35 to 0.90×Lw) from the front side of the substrate and then suctioned at a predetermined airflow speed, dried at 100° C. and then fired at 500° C., and thereby a first Pd layer was formed. Then, the Rh slurry was supplied over a length of 80% (0.8×Lw) from the front side of the substrate and then suctioned at a predetermined airflow speed, dried at 100° C. and then fired at 500° C., and thereby a second Rh coating layer was formed. Thereby, catalyst bodies of Examples 3-1 to 3-6 were obtained.

In Examples 3-7 to 3-10, first, as shown in Table 5, the Pt slurry was supplied over a length of 35 to 90% (0.35 to 0.90×Lw) from the rear side end of the substrate and then suctioned at a predetermined airflow speed, dried at 100° C. and then fired at 500° C., and thereby a first Pt layer was formed. Next, the Pd slurry was supplied over a length of 67% (0.67×Lw) from the front side end of the substrate and then suctioned at a predetermined airflow speed, dried at 100° C. and then fired at 500° C., and thereby a first Pd layer was formed. Then, the Rh slurry was supplied over a length of 80% (0.8×Lw) from the front side of the substrate and then suctioned at a predetermined airflow speed, dried at 100° C. and then fired at 500° C., and thereby a second Rh coating layer was formed. Thereby, catalyst bodies of Examples 3-7 to 3-10 were obtained.

(Evaluation of Exhaust Gas Purification Performance)

For the prepared catalyst bodies of the examples, the purification performance of methane gas in a natural gas (CNG) vehicle was evaluated in the same manner as in Test Example 1. Specifically, the catalyst body of each example was installed in the exhaust path of a vehicle with an in-cylinder direct injection natural gas engine that burns at a theoretical air fuel ratio (stoichiometric CNG direct injection vehicle, 1.5 L). Then, the methane discharge amount (mg/km) when this vehicle was driven according to WLTC (Worldwide harmonized Light duty Test Cycle) was measured. The results are shown in the following Table 5, and FIG. 10 and FIG. 11.

TABLE 5

| Example | Pd layer Concentration of Pd (g/L) | Pd layer Coating length (%) | Pt layer Concentration of Pt (g/L) | Pt layer Coating length (%) | Rh layer Concentration of Rh (g/L) | Rh layer Coating length (%) | Pd/Pt layer weight (%) | Methane discharge amount (mg/km) |
|---|---|---|---|---|---|---|---|---|
| 2-1 | 3 | 50 | 3 | 50 | 0.15 | 80 | 0.00 | 28.80 |
| 3-1 | 3 | 35 | 3 | 67 | 0.15 | 80 | 2 | 25.97 |
| 3-2 | 3 | 50 | 3 | 67 | 0.15 | 80 | 17 | 24.61 |
| 3-3 | 3 | 60 | 3 | 67 | 0.15 | 80 | 27 | 25.43 |
| 3-4 | 3 | 67 | 3 | 67 | 0.15 | 80 | 34 | 28.80 |
| 3-5 | 3 | 80 | 3 | 67 | 0.15 | 80 | 47 | 29.41 |
| 3-6 | 3 | 90 | 3 | 67 | 0.15 | 80 | 57 | 40.65 |
| 3-7 | 3 | 67 | 3 | 35 | 0.15 | 80 | 2 | 29.57 |
| 3-8 | 3 | 67 | 3 | 50 | 0.15 | 80 | 17 | 26.96 |
| 3-9 | 3 | 67 | 3 | 67 | 0.15 | 80 | 34 | 28.8 |
| 3-10 | 3 | 67 | 3 | 80 | 0.15 | 80 | 47 | 27.39 |

Figure 10:
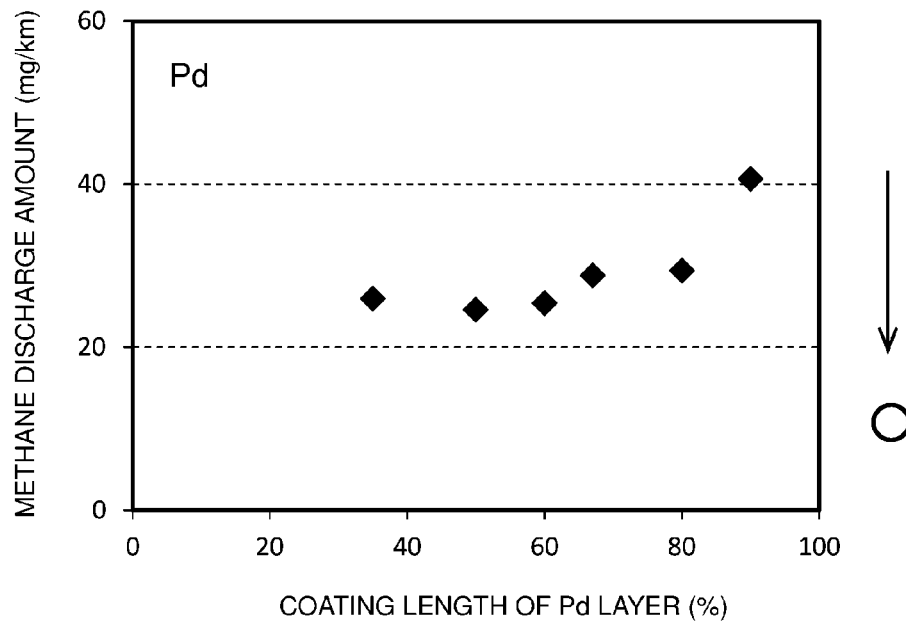
FIG. 10 is a graph showing the relationship between a length of a Pd layer and a methane discharge rate of catalyst bodies of examples.

FIG. 10 is a graph showing the relationship between the coating length of the Pd layer and the methane discharge amount for the catalyst bodies of Example 3-1 to Example 3-6. As shown in FIG. 10, it was confirmed that, when the length of the Pt layer was kept constant and the length of the Pd layer was changed, a change in the methane discharge amount was observed. It was found that the methane discharge amount was large when the coating length of the Pd layer was too short or too long. The coating length of the Pd layer may be adjusted to about 30% or more in order for the Pt layer to function favorably, and it can be said that 35% or more or 40% or more was more preferable. However, it is thought that, when the coating length of the Pd layer was too long, the efficiency of contact between the Pt layer and the exhaust gas decreased, and the methane removal effect was also reduced. The coating length of the Pd layer may be adjusted to, for example, 85% or less, and it can be said that 80% or less or 70% or less was more preferable.

Figure 11:
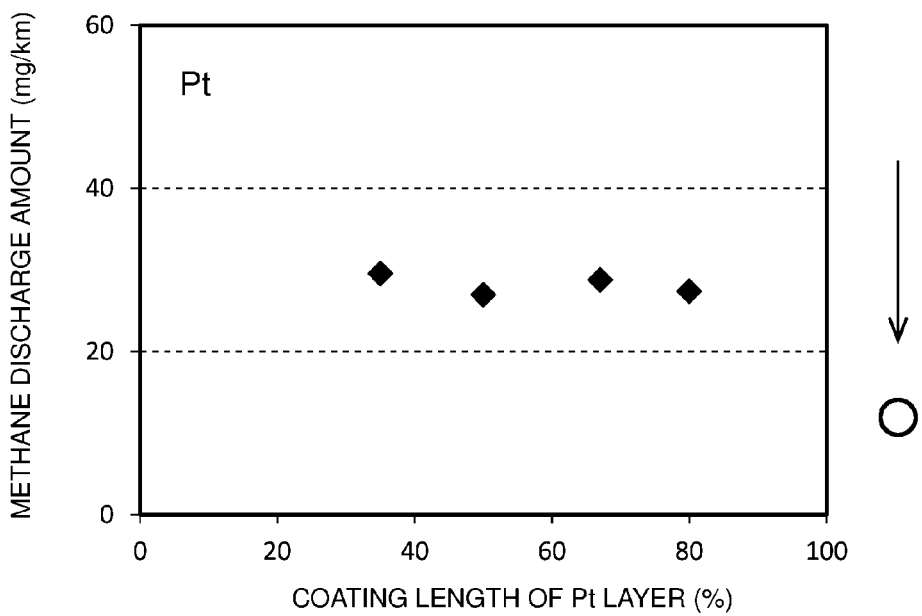
FIG. 11 is a graph showing the relationship between a length of a Pt layer and a methane discharge rate of catalyst bodies of examples.

FIG. 11 is a graph showing the relationship between the coating length of the Pt layer and the methane discharge amount for the catalyst bodies of Example 3-7 to Example 3-10. As shown in FIG. 11, it was confirmed that, when the length of the Pd layer was made constant, and the length of the Pt layer was changed, almost no change was observed in the methane discharge amount compared to when the length of the Pd layer was changed. It can be said that the coating length of the Pt layer may be any length from about 30% to about 85%. However, it is thought that, when the coating length of the Pd layer was too short, the methane removal effect was also reduced. The coating length of the Pd layer may be adjusted to, for example, 20% or more, and it can be said that 25% or more or 30% or more was more preferable.

While specific examples of the present invention have been described above in detail, these are only examples, and do not limit the scope of claims. The technology described in the claims includes various modifications and changes of the specific examples exemplified above.

For example, in the above embodiment, the Rh layer 23 is formed over 80% of the total length Lw of the substrate 10, but the length $L_{23}$ of the Rh layer 23 is not limited thereto. For example, the Rh layer 23 was formed from the front side in Test Examples 1 and 3, and was formed from the rear side in Test Example 2. As can be understood from this, the detailed position of the Rh layer 23 is not limited as long as it is in contact with the Pd layer 21 and the Pt layer 22, and the Rh layer 23 can be formed with an Lw of 100% (that is, $L_{23}$ is 80 to 100%) from the first end part 10a to the second end part 10b. In addition, although the auxiliary effect of the Pd layer 21 and the Pt layer 22 according to the Rh layer 23 may be diminished, the length $L_{23}$ of the Rh layer 23 can be shorter than 80%.

In addition, for example, in the above embodiment, the internal combustion engine 2 is a CNG engine, but the internal combustion engine 2 may be an in-cylinder direct injection gasoline engine, an in-cylinder direct injection diesel engine, or the like that burns at a theoretical air fuel ratio. These internal combustion engines 2 may be configured so that F/C control, I/S control, or the like is performed by the ECU 7. In addition, these internal combustion engines 2 may be engines mounted in hybrid vehicles including a vehicle driving power source.

The invention claimed is:

1. An exhaust gas purification catalyst configured to be disposed in an exhaust path of an internal combustion engine and purify an exhaust gas discharged from the internal combustion engine and including methane, the exhaust gas purification catalyst comprising:
   a substrate that divides cells through which an exhaust gas flows and
   a catalyst layer that is provided on a surface of the substrate,
   wherein the catalyst layer includes
   a palladium layer containing palladium that extends from a first end part, which is an end part on a side of the cells into which an exhaust gas flows, to a second end part, which is an end part on a side of the cells from which an exhaust gas flows out,
   a platinum layer containing platinum that extends from the second end part to the first end part, and
   a rhodium layer having a metal catalyst that consists only of rhodium, wherein the rhodium layer is laminated with both the palladium layer and the platinum layer,
   wherein a ratio "A/B" of a molar amount "A" of the palladium contained per unit volume of the substrate of a portion in which the palladium layer is provided in a length direction from the first end part to the second end part of the substrate to a molar amount "B" of the platinum contained per unit volume of the substrate of a portion in which the platinum layer is provided in the length direction is 1.2 or more and 2.8 or less.

2. The exhaust gas purification catalyst according to claim 1, wherein the palladium layer is provided in a region of 80% or less when a range from the first end part to the second end part of the substrate is 100%.

3. The exhaust gas purification catalyst according to claim 1, wherein the rhodium layer is provided in a region of 60% or more and 100% or less from the first end part when the range from the first end part to the second end part of the substrate is 100%.

4. The exhaust gas purification catalyst according to claim 1, wherein the platinum layer is provided in a region of 30% or more and 80% or less from the second end part when the range from the first end part to the second end part of the substrate is 100%.

5. The exhaust gas purification catalyst according to claim 1, wherein the rhodium layer is provided to cover a part or all of an upper surface of the palladium layer and the platinum layer.

6. The exhaust gas purification catalyst according to claim 1, which is used to purify an exhaust gas discharged from an internal combustion engine that uses natural gas as a fuel.

* * * * *